Patented Nov. 25, 1930

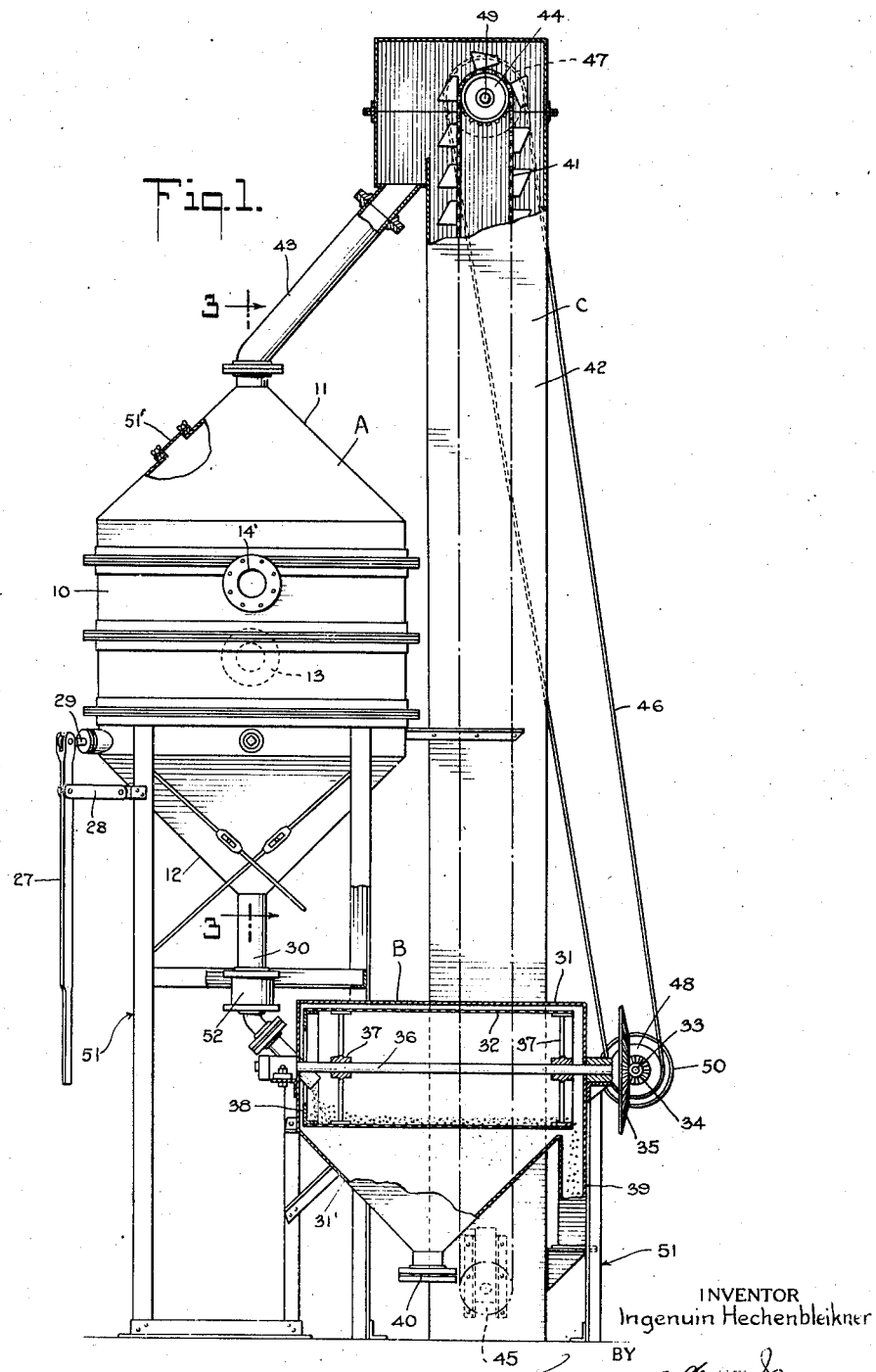

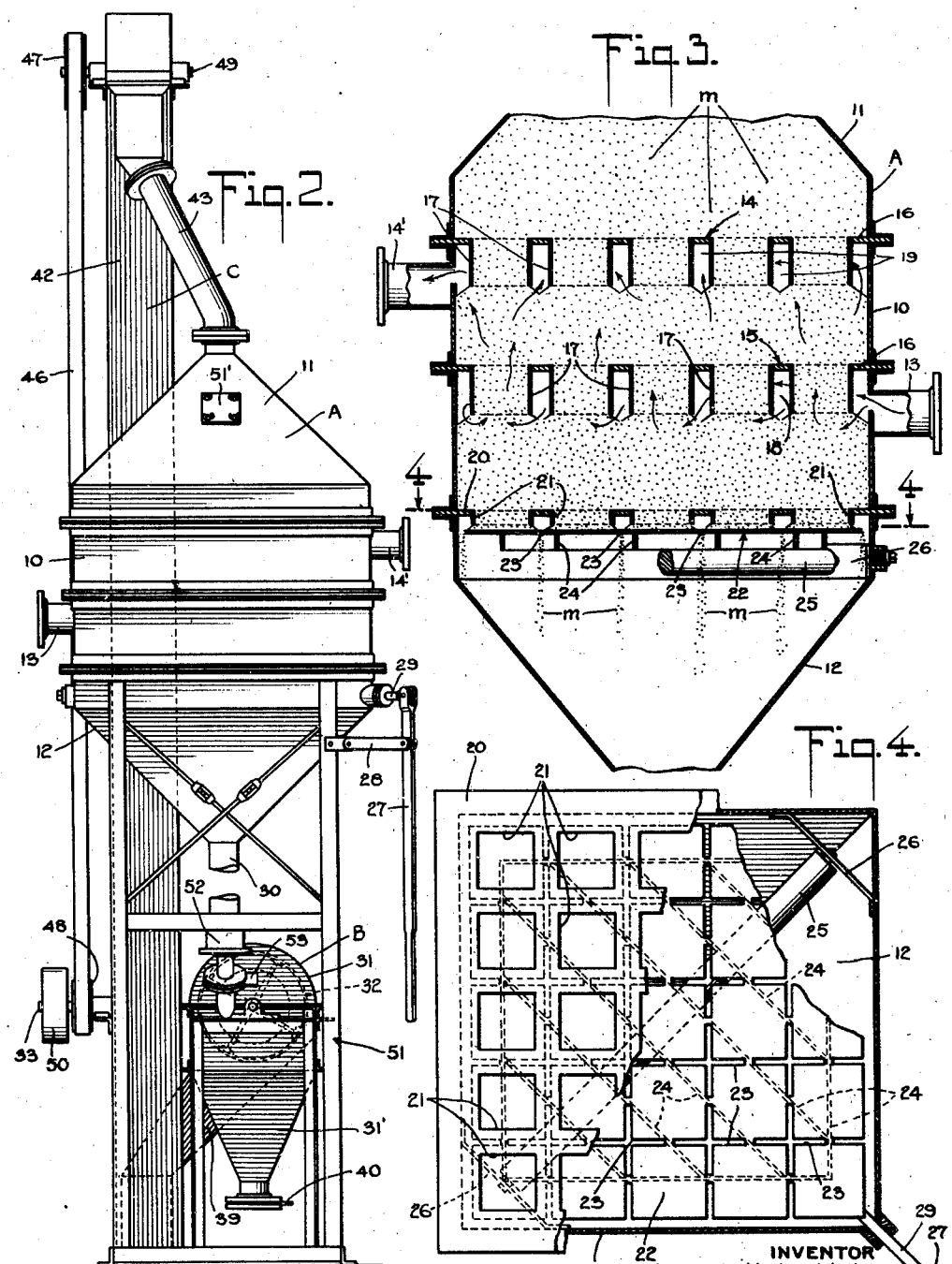

1,782,823

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

FILTERING AND DUST-COLLECTING APPARATUS

Application filed April 17, 1928. Serial No. 270,602.

This invention relates to the art of filtering or purifying substances such as gases, and has special reference to the provision of an improved apparatus for continuously filtering gases or the like and of recovering the valuable constituents separated from the gases.

The invention is directed particularly to apparatus for removing dust from hot gases obtained, for example, from an ore smelter or burner so as to purify the gases for use in other processes and for effecting a recovery of the valuable constituents contained in the removed or separated dust.

The objects of the invention are directed more generically to the provision of apparatus for practicing a continuous method of filtering which consists in passing the substance to be filtered or purified through a region containing a loose filter mass such as a sand filter mass, and in feeding the filter mass into, through and from said region so that a clean filter mass or material is always supplied to, and the filter mass containing the filtered impurities is continuingly removed from said filtering region; the further method of filtering gases or the like from contaminating dust and of recovering the valuable constituents of the filtered dust which includes the cleansing of the contaminated filter mass in such a way as to remove therefrom and recover the dust therein.

A further prime object of the invention centers about a method consisting of the steps of filtering a substance, cleansing the filter and recovering the filtered ingredient from the filter, which steps are carried out or practiced by the present apparatus in a cyclic or continuous manner.

A corollary object of the invention is directed to the provision of apparatus for practicing the above method or the steps of the method in sequence to produce an operating cycle, the said apparatus being designed and constructed so as to be capable of continuous use with a minimum of surveyance or care, and which may be supervised or operated by unskilled help.

To the accomplishment of the foregoing and such other objects as will hereinafter appear, my invention consists in the apparatus and the elements thereof, and their relation one to the other as hereinafter more particularly described and sought to be defined in the claims, reference being had to the accompanying drawings which show the preferred embodiment of my invention, and in which:

Fig. 1 is a side elevational view of the apparatus of my invention with parts broken away to show the interior construction thereof, Fig. 2 is a front elevational view thereof, Fig. 3 is a fragmentary view thereof shown on an enlarged scale and taken in cross-section in the plane of the line 3—3, Fig. 1, Fig. 4 is a view taken in cross-section in the plane of the broken line 4—4 of Fig. 3 of the drawings.

Referring now more in detail to the drawings, the composite structural equipment of the invention comprises a filtering apparatus generally designated as A, through which a loose filter mass $m$ is cyclicly or continuously fed; a filter cleansing and dust separating and collecting apparatus generally designated as B, which receives the contaminated filter mass from the apparatus A and which cleanses the same for reuse; and a conveying apparatus generally designated as C, which functions to convey the cleansed filter material or mass from the apparatus B to the filtering apparatus A for reuse therein.

In the exemplification of the invention shown in the drawings, the apparatus is designed for filtering hot gases obtained, for example, from an ore smelter or burner; and for such purposes the filtering apparatus A comprises a holder or chamber through which the hot gases are caused to flow and preferably counter-current to the filter mass fed therethrough. In the preferred embodiment of the construction, the filtering apparatus is designed so that the gas flows therethrough in a plurality of paths or streams and in a manner so as to be acted upon uniformly by the filter mass therein. To carry out these objects, the holder or container A comprises a sectionalized body 10 having an inverted cone-shaped top 11 and a hopper-shaped bottom 12, the said body 10 being provided with a gas inlet 13 at one side thereof and with a gas outlet 14' at the other side thereof. The body 10 of the holder is subdivided by the two grid structures 14 and 15 so as to provide for a multiplicity of gas streams or paths between the inlet and outlet means 13 and 14'. Each of these grid structures comprises an orificed plate or header plate 16, into the orifices of which are fitted a plurality of tubular elements 17, 17 as clearly shown in Fig. 3 of the drawings, the construction and arrangement being such that free spaces 18 and 19 are provided for the respective grid structures 15 and 14, the free or unfilled space 18 being in open communication with the gas inlet 13 and the free or unfilled space 19 being in open communication with the gas outlet 14'. With this construction it will be seen that the gas flow having ingress at 13 will move from the free space 18 into a multiplicity of paths or streams through the filter mass m as depicted by the arrows shown in Fig. 3 of the drawings, and into the free space 19 having egress therefrom at the outlet 14'.

In accordance with my present invention, the filter mass m, comprising preferably a granular mass such as sand, is fed into, through and from the filtering region or holder A without interruption to the filtering process and so that a clean filter material is supplied to the apparatus to replenish or replace the contaminated filter mass withdrawn therefrom.

The filtering apparatus A is preferably constructed so that the filter mass is fed therethrough gravitationally and countercurrent to the gas flow, and desirably the apparatus is provided with means for controlling or varying the speed of gravitational movement of the filter mass through the filtering region. This is accomplished by the provision of another grid-like structure 20 arranged at the bottom of the body 10 of the holder, the said grid structure being provided with a plurality of orifices 21, 21 (see Figs. 3 and 4 of the drawings); and cooperating with said grid structure 20 there is provided a plate 22 having a plurality of cross-shaped slits or openings 23, 23 which may be moved into or out of more or less registry with the non-orificed portions of the grid structure 20. The plate 22 is provided with a plurality of strengthening ribs 24, 24 at the underneath face thereof, the said ribs having supporting contact with a roller 25 arranged diagonally of the apparatus A and journalled in the corner brackets 26, 26. The plate 22 is movable over said roller and may be moved by means of a hand operated lever 27 fulcrumed on a supporting arm 28, the top end of said lever being pivotally connected to a slide rod 29 attached to the plate 22. As will be best seen from a consideration of Figs. 3 and 4 of the drawings, moving the plate 22 into and out of registry with the orifices or openings 21 of the grid structure 20, results in increasings or decreasings (respectively) the speed of movement of the sand mass through the filtering region, such variation or control of the speed being provided to suit the varying needs of service.

The dust or other impurities containing filter mass m gravitationally withdrawn from the filtering apparatus A, gravitates through the hopper 12 into and through the connecting piping 30 and falls into the cleansing and dust separating apparatus B. The apparatus B comprises a housing 31 having a hopper or funnel shaped bottom 31', at the top of which housing is journalled a rotary drum or barrel shaped screen 32. The rotary screen 32 is designed to receive motion from a driven shaft 33 having a pinion 34 meshing with a pinion 35 fixed to the screen drum shaft 36, the drum screen 32 being fixed to the shaft 36 by means of the spaced spoke wheels 37, 37. The end of the drum screen 32 which communicates with the connecting piping 30 is provided with a ring 38, while the other end of the drum is unobstructingly open, as clearly shown in Fig. 1 of the drawings, to a chute 39 leading to the conveying apparatus C. The screen 32 is of a mesh suitable to permit the entrained dust to fall through the screen into the collecting hopper 31' when the mass in the screen is agitated by the rotation thereof. The sand grains or particles cleansed by this operation move from the open end of the drum screen 32 and fall into the chute 39. The separated dust collected in the hopper 31' may be removed from the bottom thereof by opening a slide door 40 provided at the bottom of the hopper.

The conveying apparatus C, which functions to convey the cleansed filter mass from the apparatus B back to the filtering apparatus A, comprises preferably a bucket elevator 41 housed in an enclosure 42 which connects the chute 39 with a conduit 43 connected in turn for communication with the top 11 of the filtering apparatus A. The bucket elevator 41 comprises preferably a chain and bucket system trained over the top and bottom sprocket wheels 44 and 45 journalled in the casing 42, the top sprocket wheel 44 being connected to receive motion from the drive shaft 33 by means of a belt 46 trained over the pulleys 47 and 48 fixed respectively to the top sprocket wheel shaft 49 and to the drive shaft 33. The drive shaft 33 is also provided with a pulley 50 adapted to receive motion from any suitable motor (not shown). It will be understood that upon operation of the motor, the conveying apparatus will be actuated for elevating the cleansed filter mass and for depositing the same into the filtering apparatus A for reuse.

The combined apparatus is desirably compactly organized as depicted in the drawings, and the parts thereof may be suitably supported on or from a structure framework generally designated as 51. Preferably, also, there are provided sight openings or windows such as the removable sight openings 51' for the filtering apparatus A and a glass sight window 52 forming part of the connecting conduit 30. The flow of the material may also be regulated by a slide gate 53 arranged in the connecting conduit or pipe 30.

The practice of the process, by the use of the apparatus employed therewith, and the many advantages thereof will in the main be fully apparent from the above detailed description thereof. It will be seen that in the practice of the process, the gases may be continuously filtered by a filter mass which is fed through the filtering region of the apparatus A, which is then removed from the filtering region and cleansed for reuse by the apparatus B and returned by the conveyer C to replenish or refill the filtering apparatus A, the steps being carried on in a cyclic or continuous manner. It will be further seen that any valuable dust or other impurities entrained by the circulating filter mass is effectively removed and recovered or salvaged. As an example of such dust which may be reclaimed, may be mentioned potash obtained from cement dust, gold and silver dust obtained in a copper smelter or arsenic dust obtained in lead smelters. It will be also manifest that the collecting of the dust eleminates a nuisance where the dust contains no valuable constituent. The apparatus is under ready and convenient control of an unskilled operative and is designed so as to permit rapid inspection. When employed in filtering gases it possesses the desirable property of filtering the gases while hot without causing a substantial decrease in the temperature thereof, thus obviating the disadvantages incident to dust removal apparatus or precipitators of the prior art which require or produce cooling of the gases.

It will be understood that the apparatus shown may be employed cyclicly although parts of the system may be run discontinuously. Thus the filtering apparatus A may be operated intermittently by opening and then closing the plate 22 without affecting the continuous practice of the filtering process. In many cases, it is sufficient or desirable to intermittently charge the filtering apparatus A; and it will be readily appreciated that such intermittent charging may be carried out without affecting in any wise the continuity of the process of filtering the gases. This manner of re-charging is in part illustrated in the drawings, since with the parts arranged as shown in Figs. 3 and 4 of the drawings, the plate 22 forms, in effect, a closure for the bottom of the filtering apparatus A, the filter mass m being thereby retained as a body in the filtering apparatus. Even though such parts of the apparatus may be controlled intermittently, it will be seen that the process of feeding the filter mass and cleansing the same for reuse is carried on continuingly in repeated cycles.

It will be also understood that many modifications may be made in the apparatus without departing from the principal invention sought to be defined in the following claims.

What I claim is:

1. A filtering apparatus comprising a holder substantially filled with a granular filter mass, and a grid structure extending across said holder, said grid structure including an orificed plate the orifices of which are provided with means therein adjacent which free spaces are formed in the filter mass.

2. A filtering apparatus comprising a holder substantially filled with a granular filter mass, and gas distribution means therefor including a plurality of horizontal grid structures extending across said holder, each of said grid structures including an orificed plate the orifices of which are provided with means for forming free spaces in the filter mass.

3. A filtering apparatus comprising a holder substantially filled with a granular filter mass, a plurality of horizontal grid structures extending across said holder, each of said grid structures including an orificed plate the orifices of which are provided with means fitted therein around which free spaces are formed in the filter mass, a gas inlet for said holder located adjacent the free spaces beneath one of said grid structures, and a gas outlet for said holder located adjacent the free spaces beneath another of said grid structures.

4. A filtering apparatus comprising an upright holder substantially filled with a granular filter mass, a spaced pair of superposed horizontal grid structures extending across said holder, each of said grid structures including an orificed plate the orifices of which are provided with short depending tubular elements fitted therein around which free spaces are formed in the filter mass, a gas inlet for said holder located adjacent the free spaces beneath the lower grid structure, and a gas outlet for said holder located adjacent the free spaces beneath the upper grid structure.

5. A filtering apparatus comprising a holder substantially filled with a granular filter mass, a plurality of horizontal grid structures extending across said holder, each of said grid structures including an orificed plate the orifices of which are provided with short depending tubular elements fitted therein around which free spaces are formed in the filter mass, a gas inlet for said holder located adjacent the free spaces beneath one of said grid structures, a gas outlet for said holder located adjacent the free spaces beneath another of said grid structures, and means for feeding the filter mass gravitationally into, through, and from said holder.

6. A filtering apparatus comprising a holder substantially filled with a granular filter mass, a plurality of horizontal grid structures extending across said holder, each of said grid structures including an orificed plate the orifices of which are provided with short depending tubular elements fitted therein around which free spaces are formed in the filter mass, a gas inlet for said holder located adjacent the free spaces beneath one of said grid structures, a gas outlet for said holder located adjacent the free spaces beneath another of said grid structures, means for feeding the filter mass gravitationally into, through, and from said holder, screening means below said holder receiving the contaminated filter mass from said holder and operative for cleansing the same, and an elevator for returning the cleansed filter mass to said holder.

7. A filter apparatus comprising a holder substantially filled with a granular filter mass, a grid structure in said holder the orifices of which are provided with means around which gas distributing free spaces are provided, a gas inlet for said holder, a gas outlet for said holder, and means for feeding the filter mass gravitationally into said holder, through said grid structure, and from said holder.

8. A filter apparatus comprising a holder substantially filled with a granular filter mass, a plurality of horizontal header plates in said holder the orifices of which are provided with elements around which gas distributing free spaces are provided, a gas inlet and a gas outlet for said holder so located as to cause the gas to travel upwardly thru said filter mass, and means for feeding the filter mass downwardly into said holder, through said header plates, and from said holder.

9. A filter apparatus comprising a holder substantially filled with a granular filter mass, a plurality of horizontal header plates in said holder the orifices of which are provided with depending tubular elements around which gas distributing free spaces are provided, a gas inlet for said holder, a gas outlet for said holder, means for feeding the filter mass gravitationally into, through, and from said holder, screening means below said holder receiving the contaminated filter mass from said holder and operative for cleansing the same, and an elevator for returning the cleansed filter mass to said holder.

10. A filter apparatus comprising an upright holder substantially filled with a granular filter mass, a plurality of horizontal header plates in said holder the orifices of which are provided with short depending tubular elements around which gas distributing free spaces are provided, a gas inlet for said holder located adjacent the free spaces beneath a lower header plate, a gas outlet for said holder located adjacent the free spaces beneath an upper header plate, means for feeding the filter mass gravitationally into, through, and from said holder, screening means below said holder receiving the contaminated filter mass from said holder and operative for cleansing the same, and an elevator for returning the cleansed filter mass to said holder.

11. A filter apparatus comprising an upright cylindrical holder substantially filled with a granular filter mass, horizontal header plates the orifices of a plurality of which are provided with short depending tubular elements around which free spaces are provided, a gas inlet for said holder located adjacent the free spaces beneath one header plate, a gas outlet for said holder located adjacent the free spaces beneath another header plate, means for feeding the filter mass gravitationally into said holder, through said header plates, and from said holder, and feed controlling means comprising a movable apertured plate the orifices in which cooperate with those in the lowermost header plate.

INGENUIN HECHENBLEIKNER.